United States Patent
Lin et al.

(10) Patent No.: US 8,761,032 B2
(45) Date of Patent: Jun. 24, 2014

(54) RANDOM REUSE BASED CONTROL CHANNELS

(75) Inventors: Dexu Lin, San Diego, CA (US); Alexei Gorokhov, San Diego, CA (US); Aamod Khandekar, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 12/163,818

(22) Filed: Jun. 27, 2008

(65) Prior Publication Data

US 2009/0129268 A1    May 21, 2009

Related U.S. Application Data

(60) Provisional application No. 60/988,498, filed on Nov. 16, 2007.

(51) Int. Cl.
*H04L 12/26* (2006.01)
*H04W 24/02* (2009.01)
*H04L 1/00* (2006.01)

(52) U.S. Cl.
CPC ............. *H04W 24/02* (2013.01); *H04L 1/0004* (2013.01)
USPC .......................... 370/252; 370/329; 455/452.2

(58) Field of Classification Search
CPC ............................. H04L 1/0004; H04W 24/02
USPC .......................... 370/252, 310, 522; 455/452.2
See application file for complete search history.

(56) References Cited

U.S. PATENT DOCUMENTS

| | | | |
|---|---|---|---|
| 5,825,758 A | 10/1998 | Heikkinen et al. | |
| 5,828,962 A | 10/1998 | Ho-A-Chuck | |
| 5,867,478 A | 2/1999 | Baum et al. | |
| 5,920,862 A | 7/1999 | Waters | |
| 5,940,765 A | 8/1999 | Haartsen | |
| 5,970,414 A * | 10/1999 | Bi et al. | 455/456.3 |

(Continued)

FOREIGN PATENT DOCUMENTS

| | | |
|---|---|---|
| CN | 1219081 A | 6/1999 |
| CN | 1235745 | 11/1999 |

(Continued)

OTHER PUBLICATIONS

NTT Docomo et al., "L1/L2 Control Channel Structure for E-UTRA Downlink," 3GPP TSG RAN WG1 Meeting 45, R1-061181, Shanghai, China, May 8-12, 2006, pp. 1-17.

(Continued)

*Primary Examiner* — Wanda Z Russell
(74) *Attorney, Agent, or Firm* — Stanton Braden

(57) ABSTRACT

Systems and methodologies are described that facilitate wireless network transmitters blanking or reducing power on portions of bandwidth reserved for control information transmission. This mitigates interference from disparate transmitters. Furthermore, the control information portion can be divided into a plurality of OFDM tiles that are reusable by transmitters for transmitting the control information. In this regard, interference between transmitters is additionally mitigated as the transmitters can multiplex the control information over a plurality of tiles increasing the chance that at least a portion of the tiles are not interfered. The control information can be decoded by the receivers from the portion of tiles with a low probability of interference.

23 Claims, 11 Drawing Sheets

(56) References Cited

U.S. PATENT DOCUMENTS

| | | | |
|---|---|---|---|
| 6,337,988 B1 | 1/2002 | Agin et al. | |
| 6,473,619 B1 | 10/2002 | Kong et al. | |
| 6,498,932 B1 | 12/2002 | Silventoinen et al. | |
| 6,728,550 B1 | 4/2004 | Boehnke et al. | |
| 6,985,498 B2 | 1/2006 | Laroia et al. | |
| 7,302,276 B2 | 11/2007 | Bernhardsson et al. | |
| 7,426,395 B2 * | 9/2008 | Stephens | 455/452.2 |
| 7,450,559 B2 | 11/2008 | Schotten et al. | |
| 7,453,912 B2 | 11/2008 | Laroia et al. | |
| 7,522,919 B2 | 4/2009 | Yoon et al. | |
| 7,555,300 B2 | 6/2009 | Scheinert et al. | |
| 7,574,224 B2 | 8/2009 | Lane et al. | |
| 7,590,169 B2 | 9/2009 | Gaal | |
| 7,657,277 B2 | 2/2010 | Montojo et al. | |
| 7,751,510 B2 | 7/2010 | Budianu et al. | |
| 7,796,639 B2 | 9/2010 | Buckley et al. | |
| 7,830,907 B1 | 11/2010 | Petranovich et al. | |
| 7,920,494 B2 | 4/2011 | Stewart et al. | |
| 8,077,649 B2 | 12/2011 | Cai | |
| 8,077,654 B2 | 12/2011 | Sutivong et al. | |
| 8,077,801 B2 | 12/2011 | Malladi | |
| 8,085,831 B2 | 12/2011 | Teague | |
| 8,254,360 B2 | 8/2012 | Julian et al. | |
| 8,300,658 B2 | 10/2012 | Buckley et al. | |
| 2001/0001609 A1 | 5/2001 | Mikuni et al. | |
| 2001/0014608 A1 | 8/2001 | Backstrom et al. | |
| 2002/0168994 A1 | 11/2002 | Terry et al. | |
| 2003/0101404 A1 | 5/2003 | Zhao et al. | |
| 2004/0022176 A1 | 2/2004 | Hashimoto et al. | |
| 2004/0190482 A1 | 9/2004 | Baum et al. | |
| 2004/0198235 A1 | 10/2004 | Sano | |
| 2004/0203734 A1 | 10/2004 | Ishii | |
| 2005/0163070 A1 | 7/2005 | Farnham et al. | |
| 2005/0277425 A1 | 12/2005 | Niemela et al. | |
| 2006/0045050 A1 | 3/2006 | Floros et al. | |
| 2006/0111137 A1 | 5/2006 | Mori et al. | |
| 2006/0286995 A1 | 12/2006 | Onggosanusi et al. | |
| 2007/0021075 A1 | 1/2007 | Nakao | |
| 2007/0036066 A1 * | 2/2007 | Thomas et al. | 370/208 |
| 2007/0047483 A1 | 3/2007 | Khan | |
| 2007/0070967 A1 | 3/2007 | Yang et al. | |
| 2007/0082619 A1 | 4/2007 | Zhang et al. | |
| 2007/0104151 A1 | 5/2007 | Papasakellariou et al. | |
| 2007/0167160 A1 | 7/2007 | Asanuma et al. | |
| 2007/0189244 A1 | 8/2007 | Prado Pavon et al. | |
| 2007/0195899 A1 | 8/2007 | Bhushan et al. | |
| 2007/0242618 A1 | 10/2007 | Sakoda et al. | |
| 2007/0248113 A1 | 10/2007 | Ko et al. | |
| 2007/0253442 A1 | 11/2007 | Yu et al. | |
| 2007/0275746 A1 | 11/2007 | Bitran | |
| 2008/0031307 A1 | 2/2008 | Fukuoka et al. | |
| 2008/0032744 A1 | 2/2008 | Khan et al. | |
| 2008/0049690 A1 | 2/2008 | Kuchibhotla et al. | |
| 2008/0056201 A1 | 3/2008 | Bennett | |
| 2008/0081598 A1 | 4/2008 | Chandra et al. | |
| 2008/0095133 A1 | 4/2008 | Kodo et al. | |
| 2008/0130612 A1 | 6/2008 | Gorokhov et al. | |
| 2008/0132263 A1 | 6/2008 | Yu et al. | |
| 2008/0144612 A1 | 6/2008 | Honkasalo et al. | |
| 2009/0052381 A1 | 2/2009 | Gorokhov et al. | |
| 2009/0052403 A1 | 2/2009 | Hokao | |
| 2009/0080382 A1 | 3/2009 | Chen et al. | |
| 2009/0097447 A1 | 4/2009 | Han et al. | |
| 2009/0130979 A1 | 5/2009 | Bhushan et al. | |
| 2009/0131061 A1 | 5/2009 | Palanki et al. | |
| 2009/0185632 A1 | 7/2009 | Cai et al. | |
| 2009/0199069 A1 | 8/2009 | Palanki et al. | |
| 2009/0219838 A1 | 9/2009 | Jia et al. | |
| 2009/0219839 A1 | 9/2009 | Zhao et al. | |
| 2009/0252077 A1 | 10/2009 | Khandekar et al. | |
| 2009/0257388 A1 | 10/2009 | Khandekar et al. | |
| 2009/0316654 A1 | 12/2009 | Prakash et al. | |
| 2009/0316655 A1 | 12/2009 | Prakash et al. | |
| 2010/0009687 A1 | 1/2010 | Koivisto et al. | |
| 2010/0014286 A1 | 1/2010 | Yoneda et al. | |
| 2010/0040019 A1 | 2/2010 | Tinnakornsrisuphap et al. | |
| 2010/0040038 A1 | 2/2010 | Tinnakornsrisuphap et al. | |
| 2010/0062783 A1 | 3/2010 | Luo et al. | |
| 2010/0091702 A1 | 4/2010 | Luo et al. | |
| 2010/0097972 A1 | 4/2010 | Parkvall et al. | |
| 2010/0201188 A1 | 8/2010 | Robbins | |
| 2010/0329171 A1 | 12/2010 | Kuo et al. | |
| 2011/0103286 A1 | 5/2011 | Montojo et al. | |
| 2011/0103338 A1 | 5/2011 | Astely et al. | |
| 2011/0235744 A1 | 9/2011 | Ketchum et al. | |

FOREIGN PATENT DOCUMENTS

| | | |
|---|---|---|
| CN | 1770892 A | 5/2006 |
| CN | 1909417 A | 2/2007 |
| CN | 101094433 A | 12/2007 |
| EP | 0917305 | 5/1999 |
| EP | 1061705 A1 | 12/2000 |
| EP | 1420551 A2 | 5/2004 |
| EP | 1440532 | 7/2004 |
| EP | 1501328 A2 | 1/2005 |
| EP | 1679814 | 7/2006 |
| JP | 11098571 A | 4/1999 |
| JP | 2004260692 A | 9/2004 |
| JP | 2004274745 A | 9/2004 |
| JP | 2006505978 A | 2/2006 |
| JP | 2006135673 A | 5/2006 |
| JP | 2007097173 A | 4/2007 |
| JP | 2007129726 A | 5/2007 |
| JP | 2007515106 A | 6/2007 |
| JP | 2007221745 A | 8/2007 |
| JP | 2007527678 A | 9/2007 |
| JP | 2007335913 A | 12/2007 |
| JP | 2008053858 A | 3/2008 |
| JP | 2008219637 A | 9/2008 |
| JP | 2008288736 A | 11/2008 |
| JP | 2009510975 A | 3/2009 |
| JP | 2009538584 A | 11/2009 |
| RU | 2150176 | 5/2000 |
| RU | 2165678 C2 | 4/2001 |
| RU | 2002129901 A | 3/2004 |
| RU | 2262811 | 10/2005 |
| RU | 2287902 C2 | 11/2006 |
| RU | 2307481 C2 | 9/2007 |
| TW | 200404467 | 3/2004 |
| TW | 200404472 | 3/2004 |
| WO | WO9616524 | 5/1996 |
| WO | 9809469 A1 | 3/1998 |
| WO | WO0135692 A1 | 5/2001 |
| WO | WO0178440 | 10/2001 |
| WO | WO03039057 | 5/2003 |
| WO | WO-03101141 A1 | 12/2003 |
| WO | WO-2004019529 | 3/2004 |
| WO | WO2004019537 A2 | 3/2004 |
| WO | WO-2004043096 A2 | 5/2004 |
| WO | WO-2005088873 A1 | 9/2005 |
| WO | WO-2006001143 A1 | 1/2006 |
| WO | WO2006007318 A1 | 1/2006 |
| WO | WO2006020032 | 2/2006 |
| WO | WO-2006038694 A1 | 4/2006 |
| WO | WO-2006043588 A1 | 4/2006 |
| WO | WO-2006106676 A1 | 10/2006 |
| WO | WO2006134032 | 12/2006 |
| WO | WO2007024895 | 3/2007 |
| WO | WO2007025308 | 3/2007 |
| WO | WO-2007044173 A2 | 4/2007 |
| WO | WO2007044281 | 4/2007 |
| WO | WO-2007081130 A1 | 7/2007 |
| WO | WO2007091245 A2 | 8/2007 |
| WO | WO2007106980 | 9/2007 |
| WO | 2007119452 A1 | 10/2007 |
| WO | 2007137920 A1 | 12/2007 |
| WO | 2008023928 A2 | 2/2008 |

(56) References Cited

FOREIGN PATENT DOCUMENTS

| WO | WO2008049136 | 4/2008 |
|---|---|---|
| WO | 2008086149 | 7/2008 |

OTHER PUBLICATIONS

NTT Docomo et al., "PUCCH Structure Considering Sounding RS Transmission in E-UTRA Uplink," 3GPP TSG RAN WG1 Meeting #50, R1-073700, Athens, Greece, Aug. 20-24, 2007, pp. 1-3.
International Search Report—PCT/US08/079888, International Search Authority—European Patent Office, Feb. 23, 2009.
Written Opinion—PCT/US08/079888, International Search Authority—European Patent Office, Feb. 23, 2009.
3GPP: "3rd Generation Partnership Project; Technical Specification Group Radio Access network; Evolved Universal Terrestrial Radio access (E-UTRA); Physical channels and Modulation (Release 8)" Internet, Citation, Mar. 2008, sections 6-6.2.4 and 6.10 to 6.10.3.2, pp. 1-65, XP002537575.
Hooli K et al: "Flexible Spectrum Use between WINNER Radio Access Networks" PROC. 1st Mobile & Wireless, Myconos (Greece),, Jun. 4, 2006, pp. 1-5, XP003020776 p. 1, paragraph 1, p. 2, paragraph 2.
LG Electronics: "Multiplexing of MBMS and unicast transmission in E-UTRA downlink; R1-060054" 3GPP TSG-RAN WG1 Meeting Ad Hoc Lte, vol. R1-060054, Jan. 23, 2006, pp. 1-5, XP003016637.
Qualcomm Europe: "Neighbor Cell Search—Analysis and Simulations" 3GPP Draft; R1-063432, 3rd Generation Partnership Project (36PP), Mobile Competence Centre ; 650, Route Des Lucioles ; F-06921 Sophia-Antipolis Cedex ; France, No. Riga, Latvia; 20061106, Nov. 1, 2006, XP050103869 paragraph [04.1]-paragraph[04.3].
Ravi Palanki "Update on out-of-band pilot design for LBC FDD," ftp://ftp.3gpo2.org/TSGC/Working/2006/2006-12-Mau/TSG-C-2006-12-Maui/WG3/C30-20061204-045_QCOM_update_on_out-of-band_pilot_design_for_LBC_FDD.pdf.Dec. 2006.
"High Performance Space Frequency Interleaved MIMO-OFDM Eigen mode Transmission systems," Vehicular Technology Conferences, 2006, VTC-2006 IEEE 64th, Sep. 25-28, 2006, pp. 1-5.
Taiwan Search Report—TW09714004—TIPO—Jul. 10, 2012.
3rd Generation Partnership Project; Technical Specification Group Radio Access Network; Multiplexing and channel coding (FDD); 3GPP TS 25.212 V5.10.0 (Jun. 2005) Release 5.
LG Electronics: "DL PDCCH/PCFICH/RS transmission in MBSFN subframe," R1-073477, 3GPP TSG RAN WG1 #50,7.2.3, Aug. 20-24, 2007, pp. 2.
NEC Group: "Some issues related to MBSFN sub-frame structure", R1-071501, RAN WG1 meeting 48bis, 30.03.2007,http://www.3gpp.org/ftp/tsg_ran/WG1_RL1/TSGR1_48b/Docs/R1-071501.zip.
Nokia et al: "Issues regarding MBSFN subframes", 3GPP Draft; R1-074863, 3rd Generation Partnership Project (3GPP), Mobile Competence Centre; 658, Route Des Lucioles, F-06921 Sophia-Antipolis Cedex; France, vol. RAN WG1, No. Korea; 20071030, Oct. 30, 2007, XP050108319.

* cited by examiner

RANDOM REUSE BASED CONTROL CHANNELS

CROSS-REFERENCE TO RELATED APPLICATIONS

This application claims the benefit of U.S. Provisional Patent application Ser. No. 60/988,498 entitled "RANDOM REUSE BASED CONTROL CHANNELS" which was filed Nov. 16, 2007. The entirety of the aforementioned application is herein incorporated by reference.

BACKGROUND

I. Field

The following description relates generally to wireless communications, and more particularly to transmitting control information over wireless communications channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, ... ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long-term evolution (LTE), 3GPP2, ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Base stations can be heterogeneously deployed such that a mobile device can connect to a base station, or other access point, that may not be the most desirable base station from the standpoint of signal strength or quality. For example, a residential home based access point can be used by a mobile device for reasons related to security, service availability, etc.; however, the access point can be physically near a base station with a greater signal strength that can interfere with the communication between the mobile device and access point. The converse can be true as well where a device communicating with the base station comes in range of the residential access point. Thus, the interference can be less consistent, and therefore less predictable, than in conventional deployments.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating blanking or reducing power over a portion of communications channels related to one or more devices for transmitting control information. The control channels utilized for transmitting the control information can be randomly reused by one or more devices transmitting the data by multiplexing control information over a plurality of portions of the channel. In this regard, the chance of interference of all the portions used to transmit the data decreases, but the data can still be ascertained if some number of portions are available for estimating and decoding.

According to related aspects, a method that facilitates communicating control information in wireless networks is provided. The method includes receiving control information transmitted over one or more tiles of a reserved control segment dedicated for transmitting the control information. The method also includes determining respective levels of interference for the one or more tiles and weighting the tiles for subsequent decoding based at least in part on the respective levels of interference.

Another aspect relates to a wireless communications apparatus. The wireless communications apparatus can include at least one processor configured to determine a level of interference on one or more control information tiles received over a reserved control segment and weigh the control information tiles for subsequent decoding based at least in part on the level of interference. The wireless communications apparatus can also include a memory coupled to the at least one processor.

Yet another aspect relates to a wireless communications apparatus that facilitates communicating control information in wireless networks. The wireless communications apparatus can include means for determining respective levels of interference for one or more tiles received over a reserved control segment dedicated for transmitting control information. The wireless communications apparatus can also include means for weighting the tiles for subsequent decoding based at least in part on the respective levels of interference.

Still another aspect relates to a computer program product, which can have a computer-readable medium including receive control information transmitted over one or more tiles of a reserved control segment dedicated for transmitting the control information. The computer-readable medium can further include code for causing the at least one computer to determine respective levels of interference for the one or more tiles and code for causing the at least one computer to weigh the tiles for subsequent decoding based at least in part on the respective levels of interference.

In accordance with another aspect, an apparatus in a wireless communication system can include a processor configured to determine respective levels of interference for one or more tiles received over a reserved control segment dedicated for transmitting control information. The processor can also be configured to weigh the tiles for subsequent decoding based at least in part on the respective levels of interference. Also, the apparatus can include a memory coupled to the processor.

According to a further aspect, a method for facilitating transmitting control information in wireless networks is provided. The method can comprise determining a subset of tiles of a communications bandwidth forming a reserved control segment dedicated for transmitting control information and transmitting control information over a portion of tiles of the reserved control segment.

Another aspect relates to a wireless communications apparatus. The wireless communications apparatus can include at least one processor configured to transmit control information over one or more tiles that are part of a reserved control segment of tiles dedicated for transmitting control information. The wireless communications apparatus can also include a memory coupled to the at least one processor.

Yet another aspect relates to a wireless communications apparatus for transmitting control information in wireless networks. The wireless communications apparatus can comprise means for reserving a subset of tiles of a communications bandwidth related to a reserved control segment dedicated for transmitting control information. The wireless communications apparatus can further comprise means for selecting a portion of the subset of tiles over which to transmit control information and means for transmitting control information over the portion of the subset of tiles.

Still another aspect relates to a computer program product, which can have a computer-readable medium including code for causing at least one computer to determine a subset of tiles of a communications bandwidth forming a reserved control segment dedicated for transmitting control information. The computer-readable medium can further comprise code for causing the at least one computer to transmit control information over a portion of tiles of the reserved control segment.

In accordance with another aspect, an apparatus can be provided in a wireless communication system including a processor configured to reserve a subset of tiles of a communications bandwidth related to a reserved control segment reserved for transmitting control information and transmit control information over a portion of tiles of the reserved control segment. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
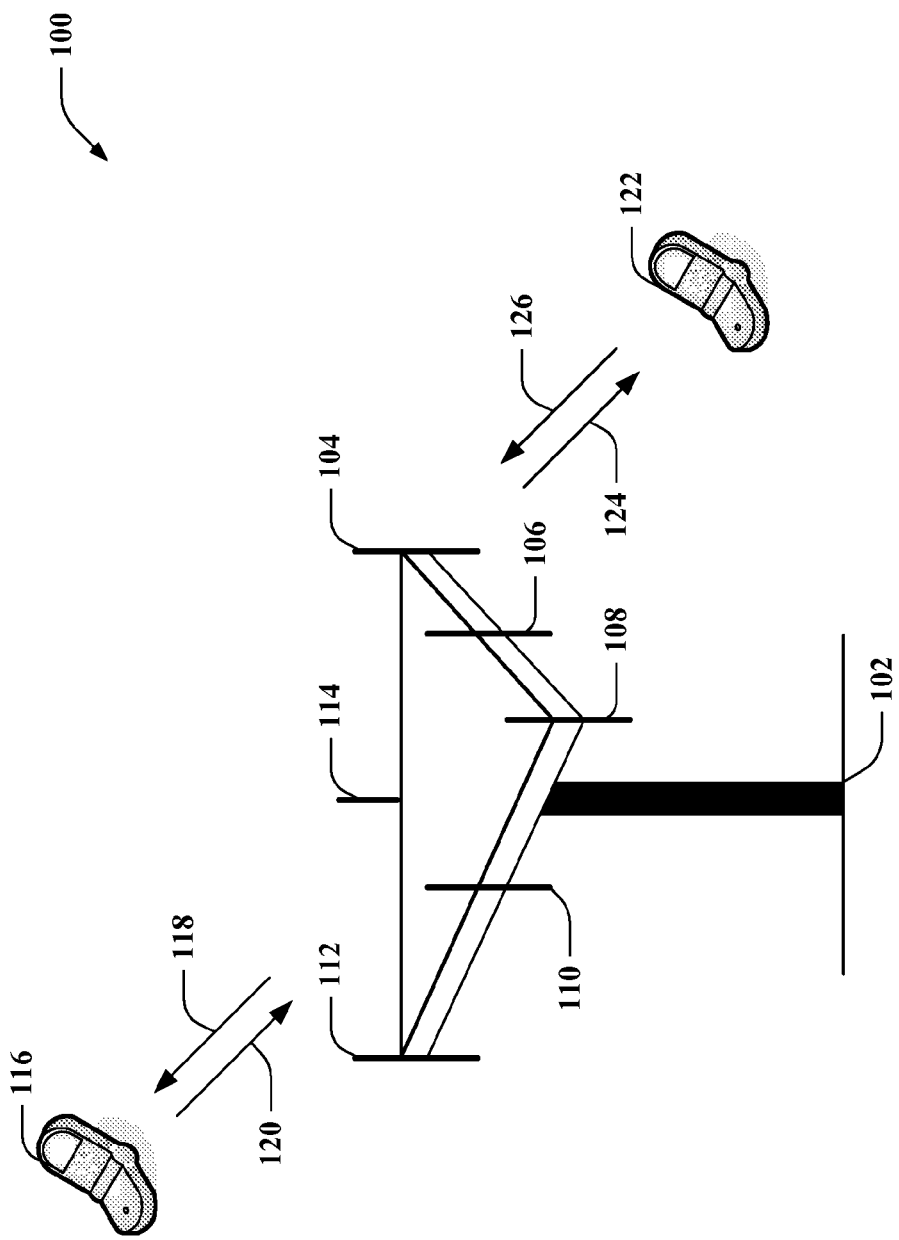
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, media capable of storing and/or containing, and/or containing instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. The communication channels can comprise one or more logical channels. Such logical channels can be provided for transmitting control information between the mobile devices 116 and 122 and the base station 102 (or from mobile device 116 to mobile device 122 in a peer-to-peer configuration, for example). In an example, the mobile devices 116 and 122 can send channel quality indicator (CQI) information to the base station 102 to indicate parameters regarding an allocated communication channel. Based on the CQI control information, for example, the base station 102 can allocate additional channel resources to the mobile devices 116 and/or 122. Additionally, the base station 102 can send control information to the mobile devices 116 and/or 122, such as acknowledgement information related to receiving data from the devices, over the control channels.

In an example, the base station 102 can be one of a plurality of base stations or access points in a wireless communications network. The network can allow connection between devices and base stations, or other access points, where the connection may not be the most desirable in view of signal strength, signal to noise ratio (SNR), etc. This allows devices to connect to base stations or other access points for other reasons, such as services offered from the base station or access point, a service level or availability, access to one or more disparate devices, and/or the like. Thus, though mobile devices 116 and 122 are communicating with the base station 102, there can be a dominant interfering access point (not shown) and/or an interfering mobile device communicating therewith. Additionally, the interference can be impulsive, such that the base station 102 and/or mobile devices 116 and/or 122 cannot predict or account for the interference in all cases.

In one example, a plurality of transmitting devices (e.g. mobile devices 116 and/or 122) can reduce transmission power for non-control information over a portion of bandwidth, such as a number of tones in an OFDM context, effectively reserving the portion of bandwidth for transmitting control information. Substantially all additional transmitting devices of the wireless communication system 100 (not shown) can also reduce non-control information transmission power over the reserved control bandwidth to substantiate a reserved control segment for transmitting control information. In addition, the devices can choose not to transmit any non-control information over the segment. In this regard, the transmitters can transmit control information over the reserved control segment without data transmission interference over the reserved control segment. The reserved control portions can repeat and/or can vary over a number of time periods or frames, for example. Additionally, the reserved control segment can be contiguous or non-contiguous in time and/or frequency, for example. The mobile devices 116 and/or 122 can transmit control information by reusing the reserved control segment to mitigate interference from disparate devices.

The reuse of the reserved control segment relates to using a fraction of the reserved control segment to transmit control channels. In this regard, similar devices (e.g., base stations or mobile devices) can utilize different portions of the reserved control segment to avoid interfering with one another. For example, the reserved control segment can be reused in many ways, such as randomly, pseudo-randomly, using a time varying function, and/or the like. Moreover, the overall reserved control segment can be divided into multiple smaller portions for reuse in transmitting control data, in one example. Additionally, for instance, the portions can be reused according to a random (or pseudo-random) selection of the portions, so that any two devices can interfere with each other on some of the portions over which they transmit but not necessarily all the portions. Thus, although unpredictable interference can exist in a wireless network for the mobile devices 116 and 122, the devices can transmit control information with a high likelihood that the base station 102 will receive the control information, or enough of the multiplexed symbols to estimate channels and properly decode the data. It is to be appreciated that multiple devices can transmit different types of control information over the fractions of the reserved control segment, for example mobile device 116 can transmit CQI information and mobile device 122 can transmit acknowledgement information over the same portion. In addition, the reserved control segment can be divided into one or more subsets and utilized such that devices using a given subset can potentially interfere with others in the same subset, but not those outside of the subset.

Figure 2:
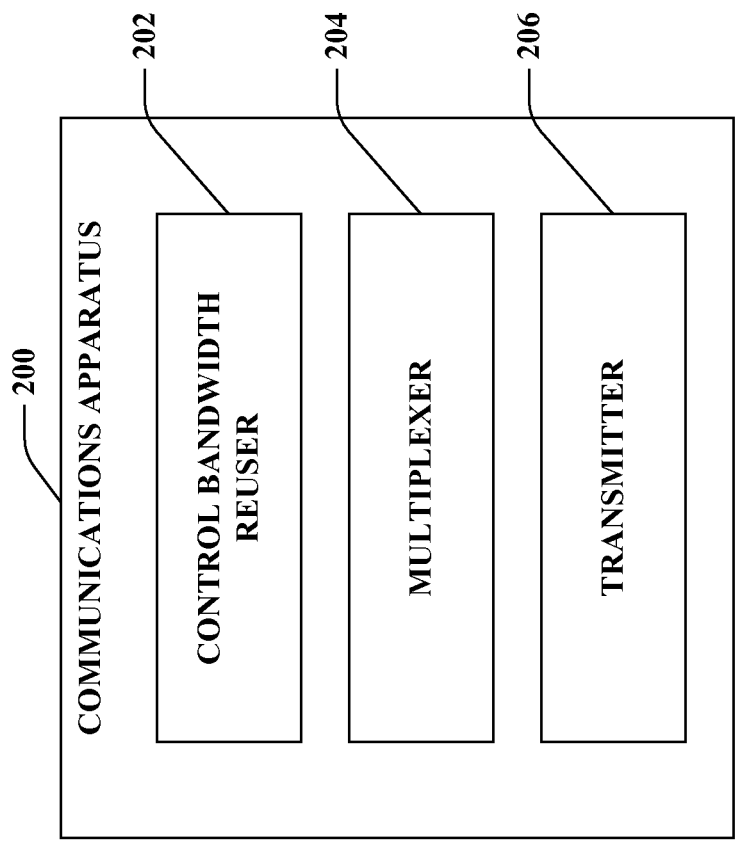
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a control bandwidth reuser 202 that can schedule control information transmission over a reserved control segment, as described, in a reuse manner (e.g. randomly, pseudo-randomly, according to a time varying function, etc.), a multiplexer 204 that can spread the control information over one or more time/frequency blocks of the reserved control segment, and a transmitter 206 that can transmit control information over the reserved control segment.

According to an example, a reserved control segment can be defined for transmitting control information from the communications apparatus and related apparatuses (not shown); the apparatuses can blank or reduce power for non-control information transmissions over the reserved control segment as described, to mitigate interference between the devices attempting to transmit control information. In one example, the communications apparatus 200 can be one of a plurality of mobile devices in a wireless communications network that communicates with one or more base stations and/or access points (or vice versa in another example). The wireless communications network can support mobile device connection with a chosen access point or base station such that the most optimal base station (e.g., determined by optimal signal strength, SNR, and/or the like) may not be chosen for communication. This can be based on a variety of factors, including services offered, accessibility or activity level for the access point (such as a home-based access point), and/or the like, for example.

Additionally, the communications apparatus 200 can be part of a heterogeneously deployed network where the communications apparatus 200, or a user thereof, may choose to connect to a lower powered receiver with lower path-loss but worse SNR, etc. For example, in some cases, it can be desirable for a terminal to be served by a low-transmit power base station having lower path loss even though that base station can have a lower received power and lower SNR. This can be because the low-power base station can serve the mobile device while causing less interference to the network as a whole. Moreover, multiple low-power base stations can simultaneously serve distinct users or mobile devices making much more efficient use of the bandwidth as compared to the high-powered base station serving a single user/device.

In this regard, there can be more physically desirable access points having higher SNR than the one chosen for connection by the communications apparatus 200 causing interference therewith. Accordingly, the interference cannot be accounted for using conventional methods and techniques for interference avoidance. Thus, devices transmitting control information can blank (e.g., substantially reduce or remove transmitting power over the portion) data transmissions, other than control channel transmissions, over a reserved control segment of bandwidth utilized for transmitting control information to facilitate transmitting the control information without substantial interference between the transmitters.

The control bandwidth reuser 202 can schedule control information to be transmitted over the reserved control segment. In this regard, the reserved control segment can be divided into one or more blocks, where each block comprises one or more contiguous or non-contiguous frequency tones over OFDM symbols in one example, and the control bandwidth reuser 202 can select a subset of the one or more blocks for transmitting control information; each block can be referred to as a tile or sub-tile of the bandwidth. Thus, probability of interference from disparate communications apparatuses can be substantially reduced by utilizing the portion of tiles. For example, the tiles can be chosen by the multiplexer 204 randomly (such as pseudo-randomly or otherwise) or according to a multiplexing scheme, for example a time varying function. Also, the random or time varying function(s) can be applied according to a media access control (MAC) identifier of the communications apparatus 200 that can uniquely identify the communications apparatus 200, or another identifier for example. Additionally, the control bandwidth reuser 202 can encode the control information using various coding techniques including, but not limited to, convolution codes, turbo codes, random codes, modulation codes, and/or repetition codes. This can also be specific for a given MAC identifier, for example. Subsequently, the transmitter 206 can transmit the control information over the selected subset of tiles. Though one or more tiles of the subset can be substantially interfered, there can be some tiles that are not interfered by utilizing multiple tiles. Using these tiles, the control information can be successfully decoded, in one example.

In addition, the control bandwidth reuser 202 can specify a number of tiles to utilize for transmitting control information. The number can be chosen at random, pseudo-randomly, etc., for example, and can be based at least in part on a MAC identifier of the communications apparatus 200, a fixed number, etc. In another example, the tiles can be planned according to a scheme where the scheme can be shared among multiple communications apparatuses of a sector or network to ensure that communication over the control information tiles is not interfered. For instance, the scheme can be a time varying function where the function can be specific according to a MAC identifier of the communications apparatus 200. Moreover, in one example, the number of tiles can be chosen according to one or more inferences, such as a number of devices, a distance of possible interfering devices, signal strength of one or more devices, location of a device with respect to the corresponding base station or access point, and/or the like. Additionally, the reserved control segment can comprise a plurality of OFDM symbols, and one or more tiles can represent contiguous or non-contiguous subcarriers of one or more contiguous or non-contiguous OFDM symbols over a portion of time. Additionally, the subcarriers utilized can vary over the portions of time.

Figure 3:
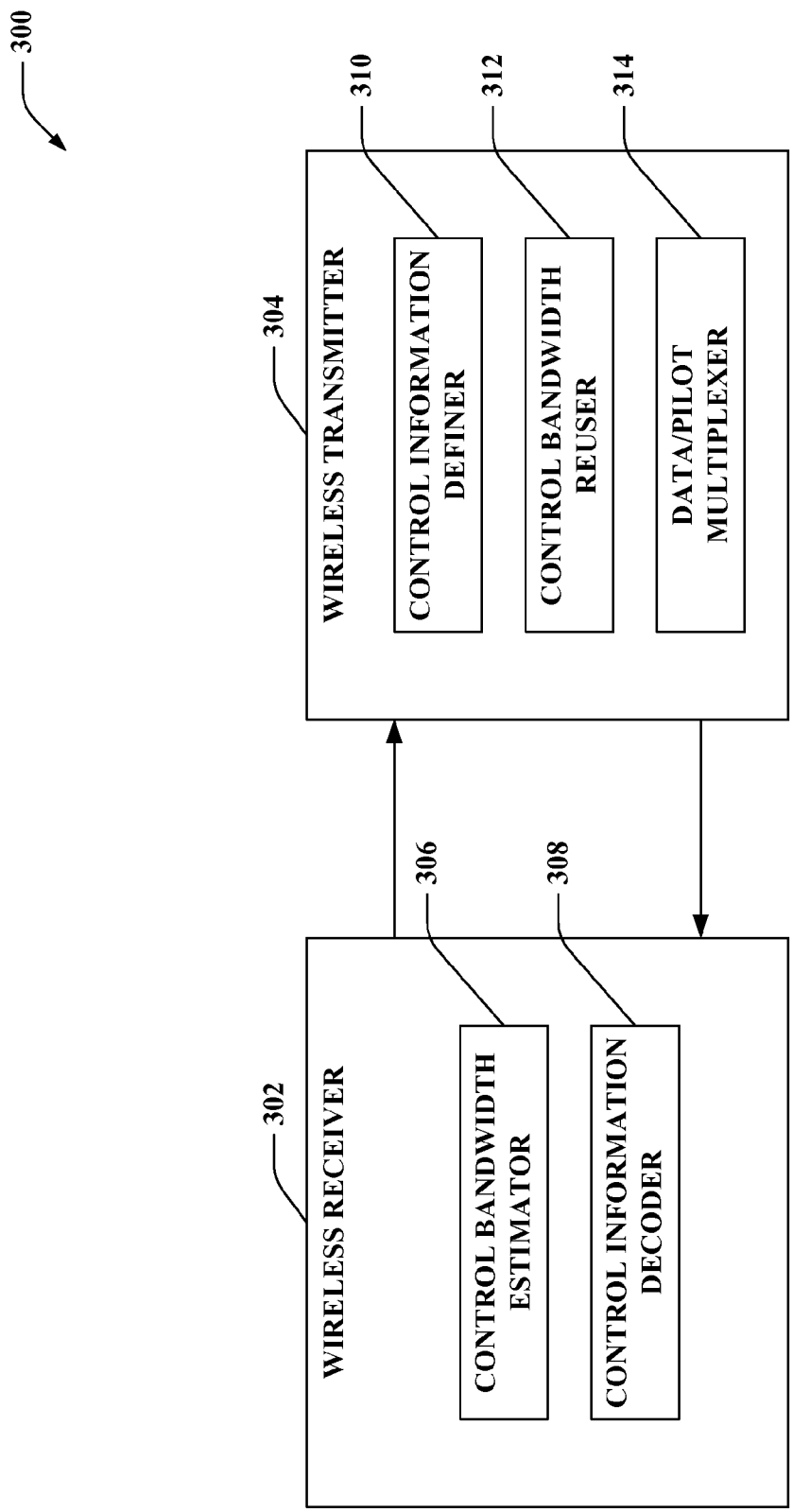
FIG. 3 is an illustration of an example wireless communications system that effectuates communicating control information in wireless networks.

Now referring to FIG. 3, illustrated is a wireless communications system 300 that can facilitate transmitting control information with low probability of interference in wireless communications networks. The system 300 includes a wireless receiver 302 that can communicate with a wireless transmitter 304 (and/or any number of disparate devices (not shown)). The wireless receiver 302 can transmit information to the wireless transmitter 304 over a forward link channel; further wireless receiver 302 can receive information from the wireless transmitter 304 over a reverse link channel or vice versa. Moreover, system 300 can be a MIMO system. Additionally, the system 300 can operate in an OFDMA wireless network (such as 3GPP, 3GPP LTE, etc., for example). Also, the components and functionalities shown and described below in the wireless receiver 302 can be present in the wireless transmitter 304 as well and vice versa, in one example. In this regard, the wireless receiver 302 and wireless transmitter 304 can be base stations, mobile devices, and/or portions thereof, for example.

Wireless receiver 302 includes a control bandwidth estimator 306 that can determine the relevant portions of bandwidth for decoding that were utilized to transmit control information by one or more communicatively coupled transmitters where the portion can be a reserved control segment for transmitting control information by the transmitters, as described, and a control information decoder 308 to decode the estimated bandwidth to determine the control information transmitted. Wireless transmitter 304 includes a control information definer 310 that can create control information to transmit to one or more receivers; the control information can relate to CQI information that can be utilized by the receivers to accord additional resources to the wireless transmitter 304 depending on the indicated channel quality, for example. The wireless transmitter 304 can additionally comprise a control bandwidth reuser 312 that can utilize the reserved control segment to transmit the defined control information, and a data/pilot multiplexer 314 that can modulate pilot information with the control information to facilitate detection of interference over the reserved control segment.

In one example, the wireless receiver 302 and wireless transmitter 304 can be communicating in a heterogeneously deployed wireless network that allows connections other than those most desirable according to signal strength/SNR. Additionally, the network can be one communicating using OFDMA such that one or more frequency tones can be defined over one or more given time periods and utilized for communication. The wireless transmitter 304 can reduce transmission power for non-control information over the reserved control segment, which can comprise a number of tones in this example.

The control information definer 310 can generate data related to quality of channel resources received from the wireless receiver 302. For example, the control information can relate to a quality of communication over the resources, SNR, and/or the like. The control bandwidth reuser 312 can determine one or more frequency tones or tiles of tones of the reserved control segment over which to transmit the control information. This determination can be made, as described previously, by a random, pseudo-random, or other multiplexing scheme (e.g., time varying function), which can be specific for a MAC identifier of a given transmitter, for example. Additionally, the control information can be coherently or non-coherently modulated in the tiles according to a random or pseudo-random sequence, a reuse scheme that decreases probability of collision over the channel among a plurality of wireless transmitter (such as wireless transmitter 304), inferences made regarding the communication or wireless network, and/or the like.

The data/pilot multiplexer 314 can be utilized to combine pilot data with the control information over the tiles to facilitate determining a decoding likelihood. For example, the wireless receiver 302 can acquire previous pilot information related to the wireless transmitter 304. After scheduling control information over the reusable portion of control bandwidth and multiplexing pilot data therewith, the wireless transmitter 304 can transmit the data over the channels to the wireless receiver 302. The control bandwidth estimator 306 can utilize the pilot data to determine likelihood of interference. Tiles or channels having a lower likelihood of interference based on the multiplexed pilot data can be estimated and control information subsequently decoded by the control information decoder 308. It is to be appreciated that the channels need not be estimated where the control information is non-coherently modulated. Additionally, interfered tiles, or those having a higher likelihood of interference, can be estimated and/or otherwise decoded as well. For example, a lower weight can be used for those tiles on which high interference is detected. Thus, reducing power over the reserved control segment with respect to data communications and transmitting control information thereover by reusing a plurality of tiles of the control channels, as described, can decrease the chance of interference among the transmitters and allow subsequent estimating and decoding of channels by utilizing the most desirable tiles according to the pilot data.

Figure 4:
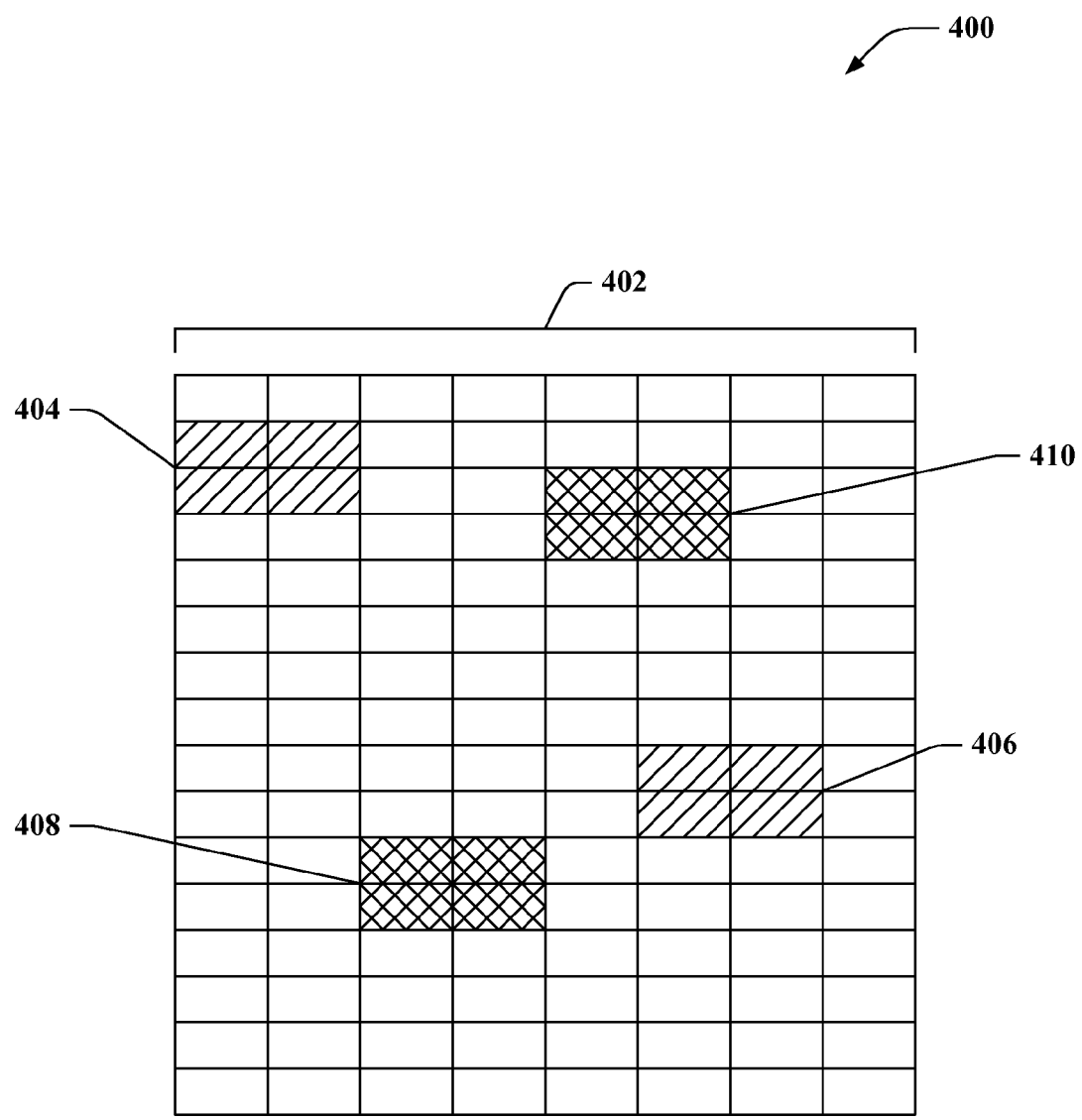
FIG. 4 is an illustration of example reserved control segment for communicating control information.

Now referring to FIG. 4, an example reserved control segment 400 utilized to transmit control information over time is shown. The reserved control segment 400 can be represented as a number of OFDM symbols 402 (8 shown here for example) having a number of frequency tones (16 shown here for example) over which to communicate control information. It is to be appreciated that more or less OFDM symbols and/or subcarriers within the OFDM symbols can be utilized for transmitting control information; this figure is representative of one of substantially limitless configurations for use with the described subject matter. Additionally, the OFDM symbols can represent one or more frames, a portion of a frame, and/or preamble thereof reserved for control information. Additionally, the OFDM symbols to use for transmitting control information can vary over different time frames, for example. A device can communicate control information with another device in a wireless mobile network, as described supra, using a portion of the reserved control segment.

Contiguous frequency tones or subcarriers on OFDM symbols (e.g., contiguous in time or frequency) can be referred to as tiles; thus 2×2 collections of tiles are shown at 404, 406, 408, and 410. It is to be appreciated that the tiles can be n×m where n and m are positive integers. For example, the tiles can be a single tone or multiple contiguous or non-contiguous tones. The tiles can represent control information communications from disparate devices. Thus, for example, disparate transmitters can reduce power for non-control information communication for the portion of bandwidth shown 402 to allow transmission of the control information without substantial interference. The tiles shown at 404 and 406 can relate to a first device communicating control information, and the tiles represented by 408 and 410 can be from a second device communicating control information. The control information can be encoded by error control codes and coherently or non-coherently modulated into higher order modulation symbols (e.g. phase-shift keying (PSK), quadrature amplitude modulation (QAM), and/or the like). Moreover, data can be multiplexed over tiles, as shown, which can be selected at random, pseudo-randomly or according to one or more multiplexing schemes that can be specific for MAC identifier. Additionally, encoding and modulation schemes can be specific for a given transmitter. Thus, the tiles can be utilized to transmit the control information over the reserved control segment with a high probability of no or little collision between the tiles.

However, as shown, the control information can be multiplexed over the tiles such that if a portion of the tiles, such as tiles at 404, are interfered, the channel can still be estimated and data decoded using the remainder of the tiles. Additionally, interfered portions of tiles can be used in the estimation as well, for example, depending on an estimation of the interference. Moreover, it is to be appreciated that channel estimation may not be necessary in the event of non-coherently modulated control information. The reuse of the portions of the reserved control segment decreases substantially the probability that all tiles of control information will be interfered so as to prevent successful estimation and decoding. In addition, pilot data can be multiplexed with the control information to facilitate detection of interference on one or more tiles. Thus, where the interference is detected according to the pilot, the given tile can be ignored or given less weight in estimating the channels for data decoding, if channel estimation is required. It is to be appreciated that pilots are not required for interference estimation, in some cases data symbols can also be utilized in absence or conjunction with pilots. Additionally, tiles 406 can, in one example, be replicated data as that in 404 to decrease the probability of collision even further. Thus, as long as one of 404 and 406 can be estimated or otherwise determined, even where 404 and/or 406 are partially interfered, the data can be decoded. Thus, having transmitters reduce power for non-control information transmission for the control channels, and allowing multiplexing of data randomly or reuseably over the control channels, data can be decoded with high probability of success in the face of interference.

Figure 5:
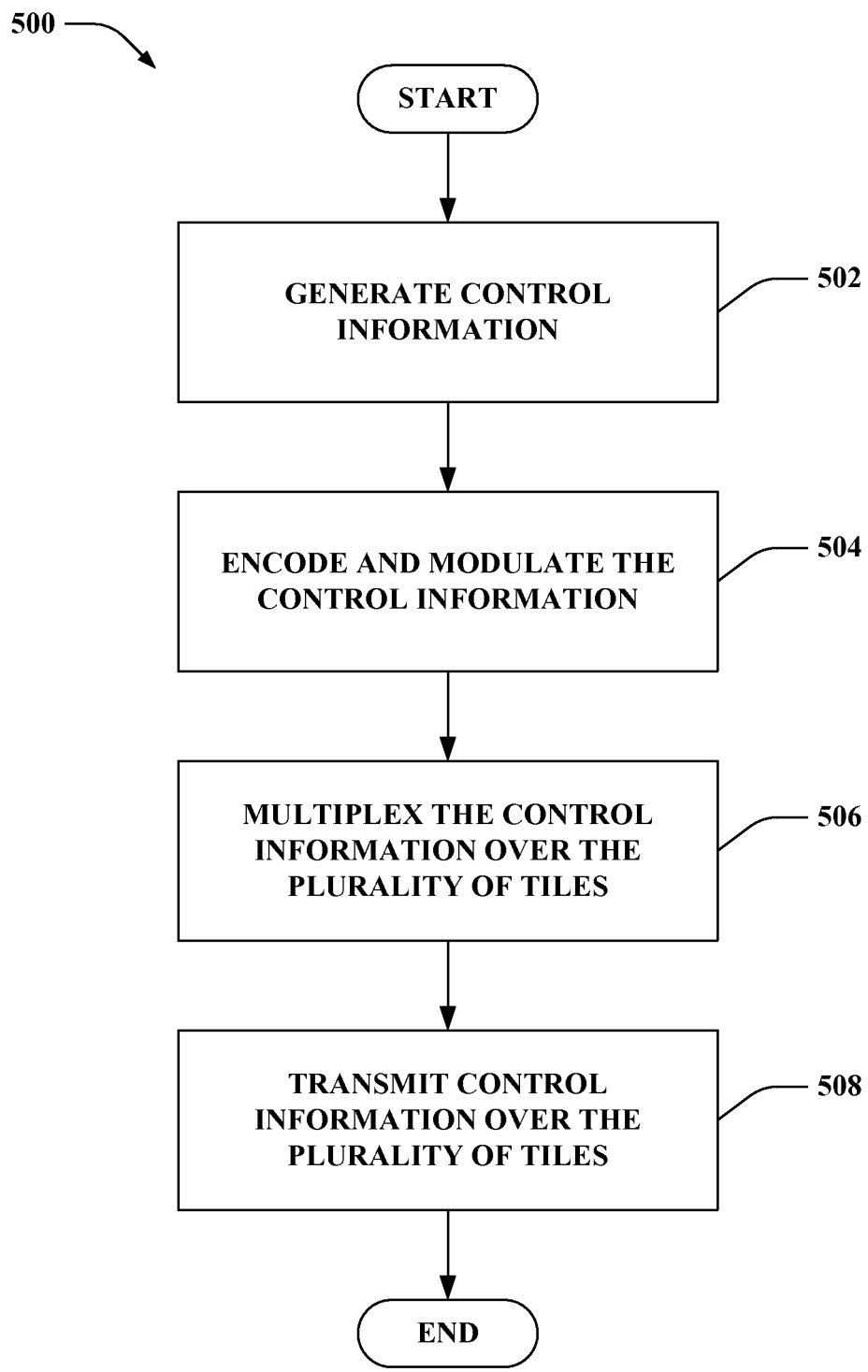
FIG. 5 is an illustration of an example methodology that facilitates communicating control information.
Figure 6:
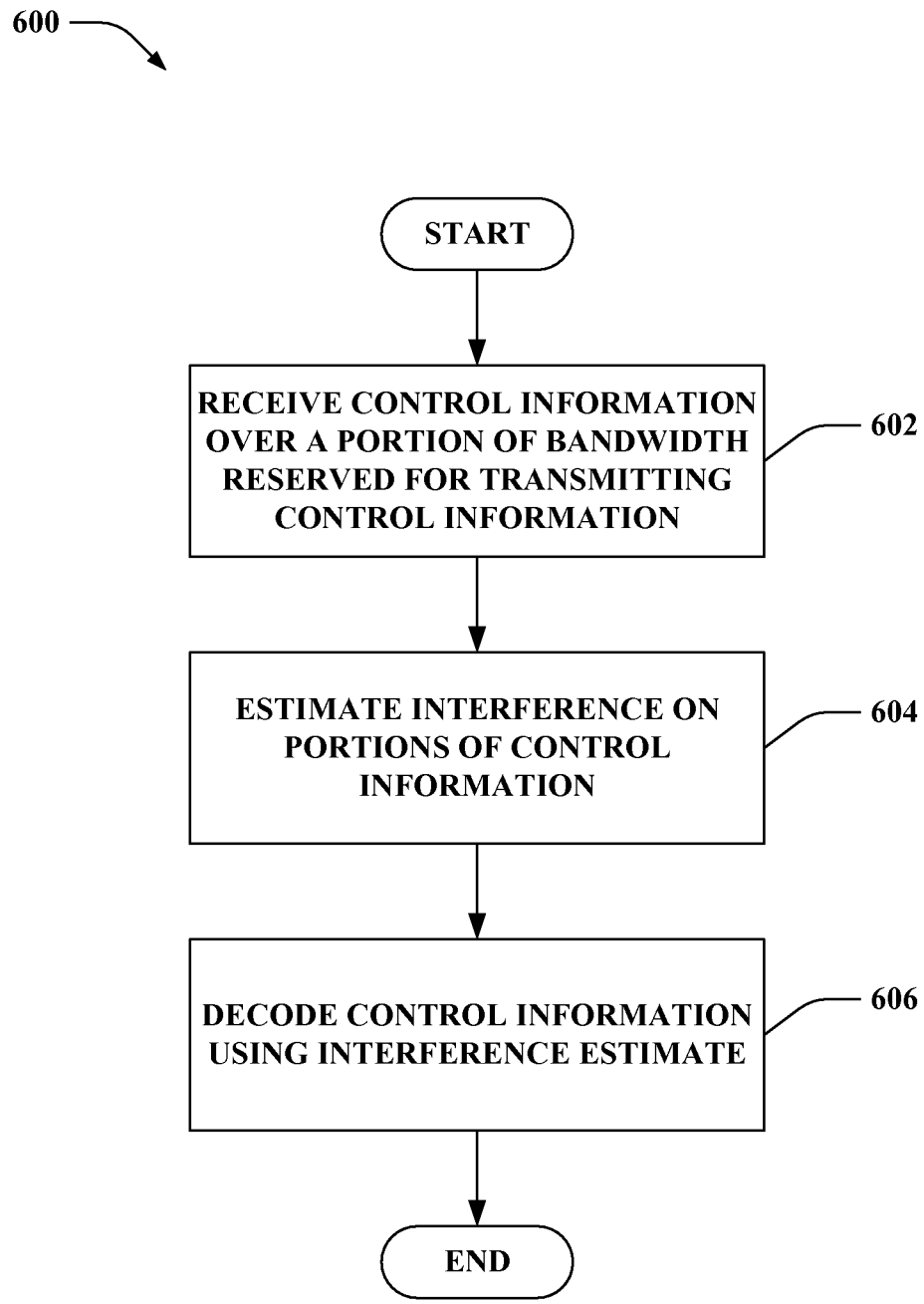
FIG. 6 is an illustration of an example methodology that facilitates receiving control information.

Referring to FIGS. 5-6, methodologies relating to transmitting control information with a high probability of successful decoding in wireless network deployments are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates transmitting control information utilizing a reserved control segment of tiles dedicated for control information. At 502, control information is generated. The control information can relate to communication quality on a data communication channel, for example, or other information related to allocated resources. At 504, the control information can be encoded and modulated. For example, the control information can encoded by one or more error control codes including Reed-Solomon, convolutional codes, block codes, turbo codes, and/or the like. The modulation can relate to using one or more of PSK, QAM, and/or the like to convert the data into one or more symbols.

At 506, the control information can be multiplexed over the plurality of tiles to provide a level of redundancy for the control information. Thus, if a portion of the tiles are interfered, the remaining tiles can be utilized to estimate channels over the bandwidth portions and/or decode the data. The data can be multiplexed over contiguous tiles and/or spread throughout the available bandwidth. The tiles for multiplexing can be chosen based on using a random deployment, planned deployment, and/or a deployment based on one or more inferences related to the wireless network as well. At 508, the control information can be transmitted over the plurality of tiles.

Now referring to FIG. 6, a methodology 600 that facilitates blanking or reducing power on a reserved control segment for transmitting control information and receiving control information over the reserved control segment is illustrated. At 602, control information can be received over a portion of bandwidth reserved for transmitting control information, such as a reserved control segment. The control information can be related channel quality, for example, including SNR of the channel and the like. The control information can be multiplexed over the reserved control segment. For example, OFDM can be utilized for the communications, and the control information can be multiplexed over one or more communications tiles that comprise the reserved control segment as described above.

At 604, interference can be estimated on at least a portion of the control information. This can facilitate interpreting control information; for example, portions that have a threshold interference can be ignored or weighed differently than portions below the threshold. It is to be appreciated that there may not be interference over a threshold for any portion of the control information, in one example. At 606, the control information can be decoded, as described, using the interference estimate.

It will be appreciated that, in accordance with one or more aspects described herein, inferences can be made regarding selecting portions of bandwidth over which to transmit control information as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to available portions of bandwidth for transmitting control information, portions that are utilized by disparate devices, existence of a scheme for transmitting the control information, interference or activity level of one or more devices or base stations, and/or the like.

Figure 7:
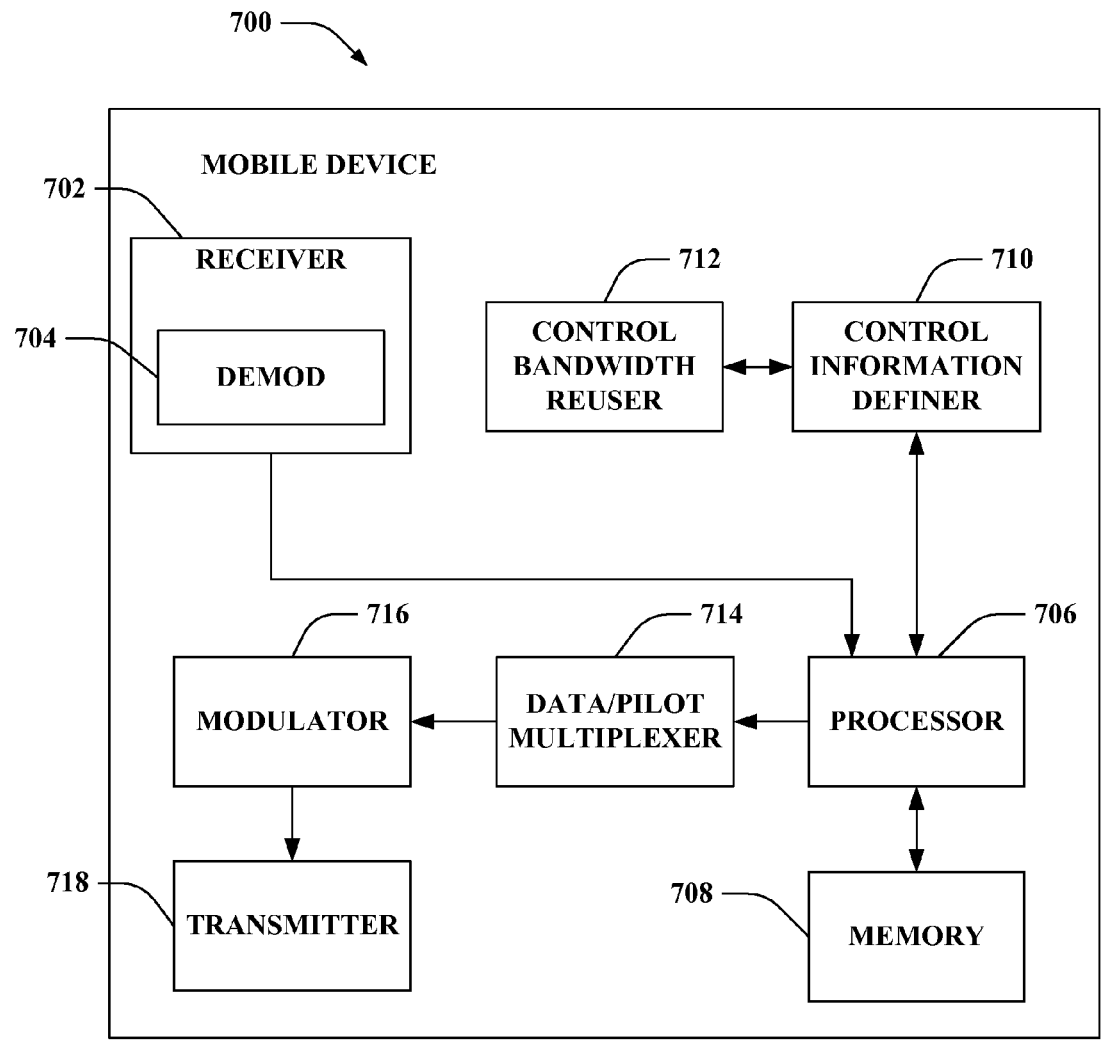
FIG. 7 is an illustration of an example mobile device that facilitates reusing a reserved control segment for communicating control information.

FIG. 7 is an illustration of a mobile device 700 that facilitates transmitting control information by reusing a reserved control segment of bandwidth. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 718, a processor that controls one or more components of mobile device 700, and/or a processor that both analyzes information received by receiver 702, generates information for transmission by transmitter 718, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a control information definer 710 that can generate control information related to communications with one or more base stations or other access points, for example, and a control bandwidth reuser 712 that can select portions of a reserved control segment of bandwidth over which to transmit control information. For example, the control bandwidth reuser 712 can select one or more parts of the reserved control segment of bandwidth (e.g. one or more tiles where the reserved control segment is a collection of OFDM symbols for given time frames) for transmitting control information specified by the control information definer 710. The control information can be multiplexed over the parts of the reserved control segment such that other devices can transmit control information over the same reserved control segment with a low probability of complete interference. Thus, a receiver of the control information can more likely decode the data when multiple parts of the reserved control segment comprise the control information.

Additionally, the processor 706 can be operatively coupled to a data/pilot multiplexer 714 that can combine pilot and control information over the multiplexed parts of the reserved control segment. This allows a receiver of the data to determine interfered portions of the control information based on success of receiving/decoding the pilot. To this end, parts of the reserved control segment that are interfered can be ignored in decoding the control information. Mobile device 700 still further comprises a modulator 716 and transmitter 718 that respectively modulate and transmit signals to, for instance, a base station, another mobile device, etc. Although depicted as being separate from the processor 706, it is to be appreciated that the control information definer 710, control bandwidth reuser 712, data/pilot multiplexer 714, demodulator 704, and/or modulator 716 can be part of the processor 706 or multiple processors (not shown).

Figure 8:
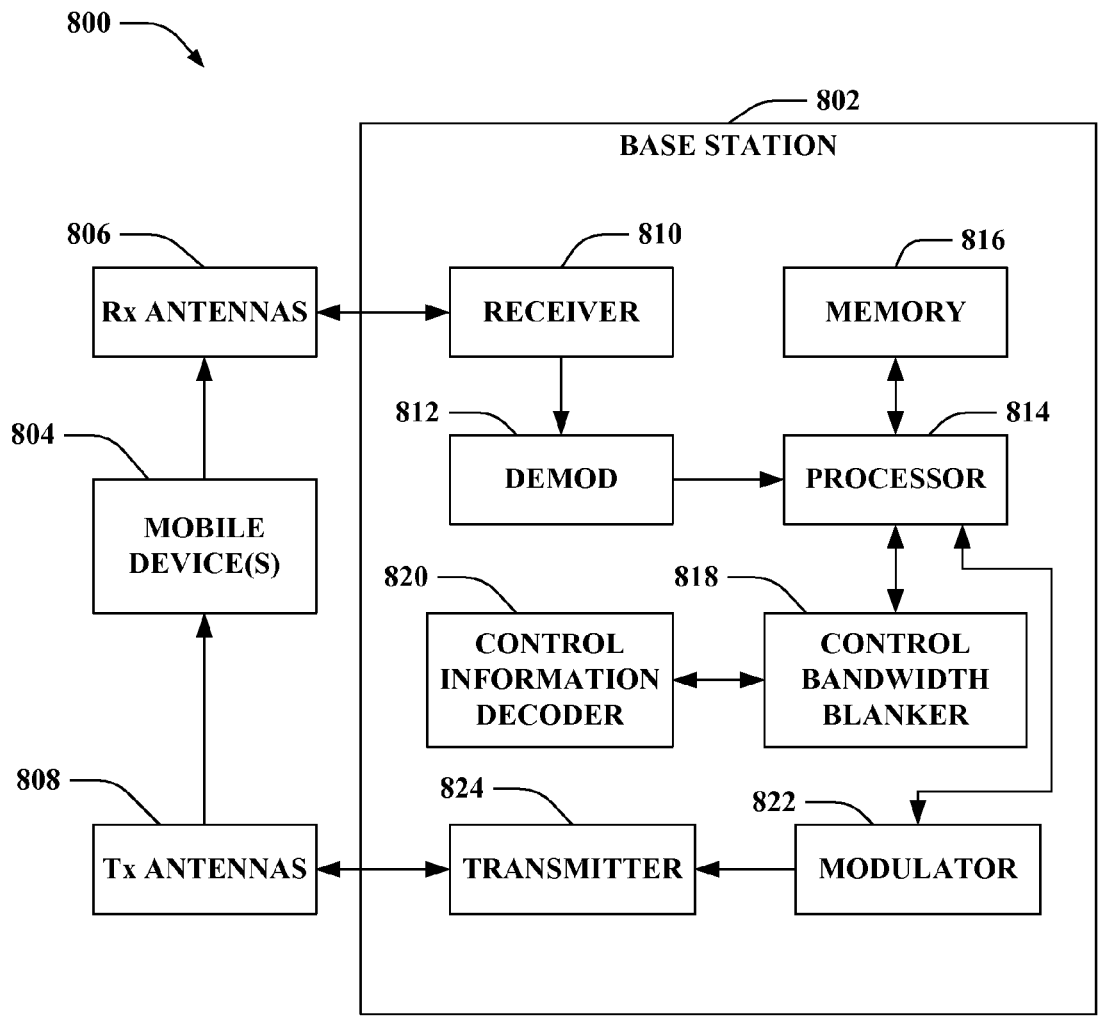
FIG. 8 is an illustration of an example system that facilitates receiving control information over a reserved control segment.

FIG. 8 is an illustration of a system 800 that facilitates blanking over a reserved control segment of bandwidth reserved for control information and decoding control information sent over the portions. The system 800 comprises a base station 802 (e.g. access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a control bandwidth estimator 818 that can estimate relevant portions of bandwidth (e.g. one or more tones of OFDM symbols in a give time period) utilized for transmitting control information from the one or more mobile devices 804 and a control information decoder 820 that can decode the control information.

For example, the control bandwidth estimator 818 can determine portions of bandwidth utilized for transmitting control information by mobile device(s) 804 according to received control information tiles as described. Moreover, the control information decoder 820 can decode received control information utilizing a number of non-interfered portions. For example, the control information can be sent over a reserved control segment along with data from other mobile device(s). Though decreased, there is still a chance that at least a portion of the transmitted control information can be interfered by one or more of the disparate mobile device(s). In this case, non-interfered portions can be determined (e.g., by multiplexed reference or pilot data) and utilized in decoding. Furthermore, although depicted as being separate from the processor 814, it is to be appreciated that the control bandwidth estimator 818, control information decoder 820, demodulator 812, and/or modulator 822 can be part of the processor 814 or multiple processors (not shown).

Figure 9:
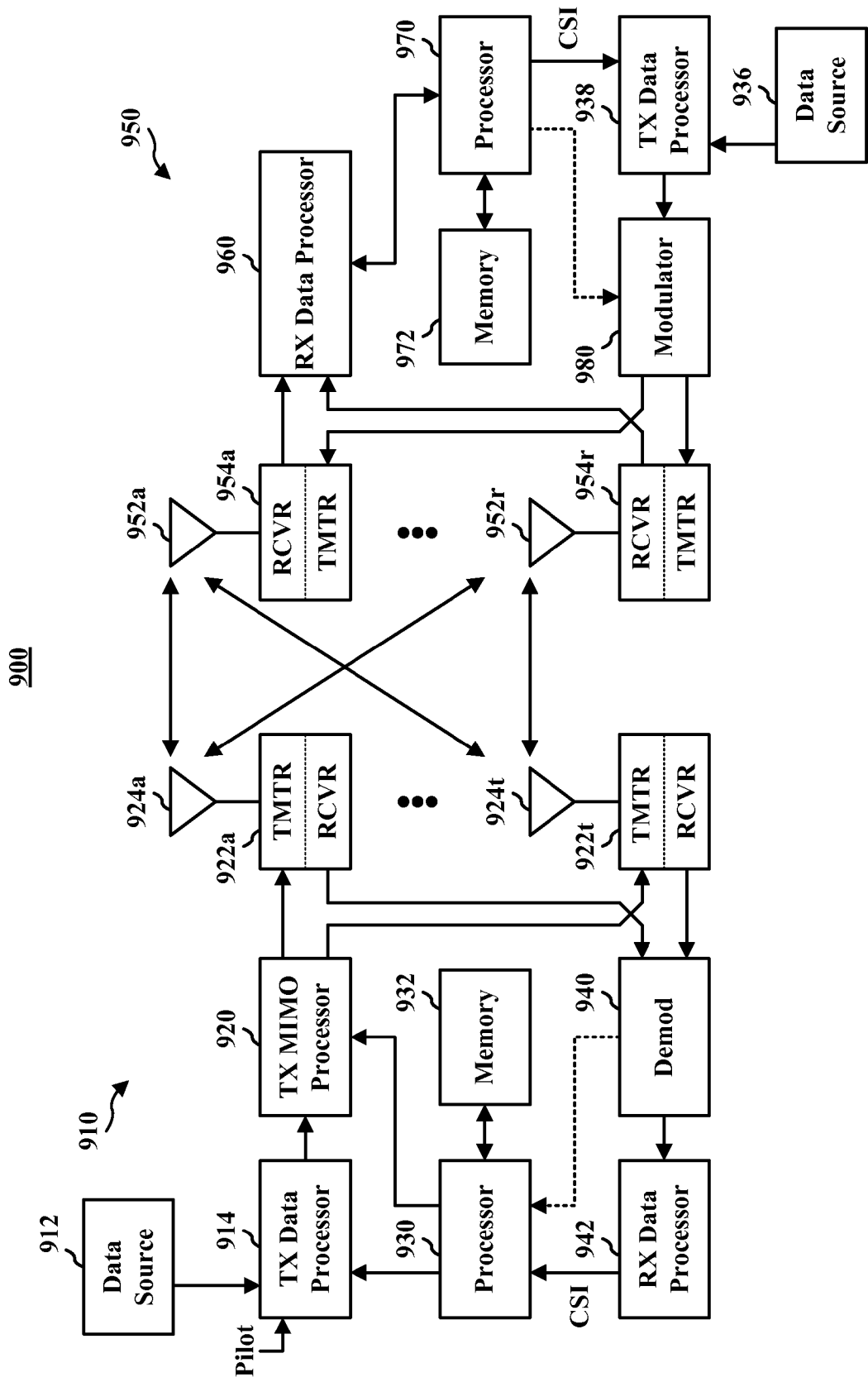
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), examples (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
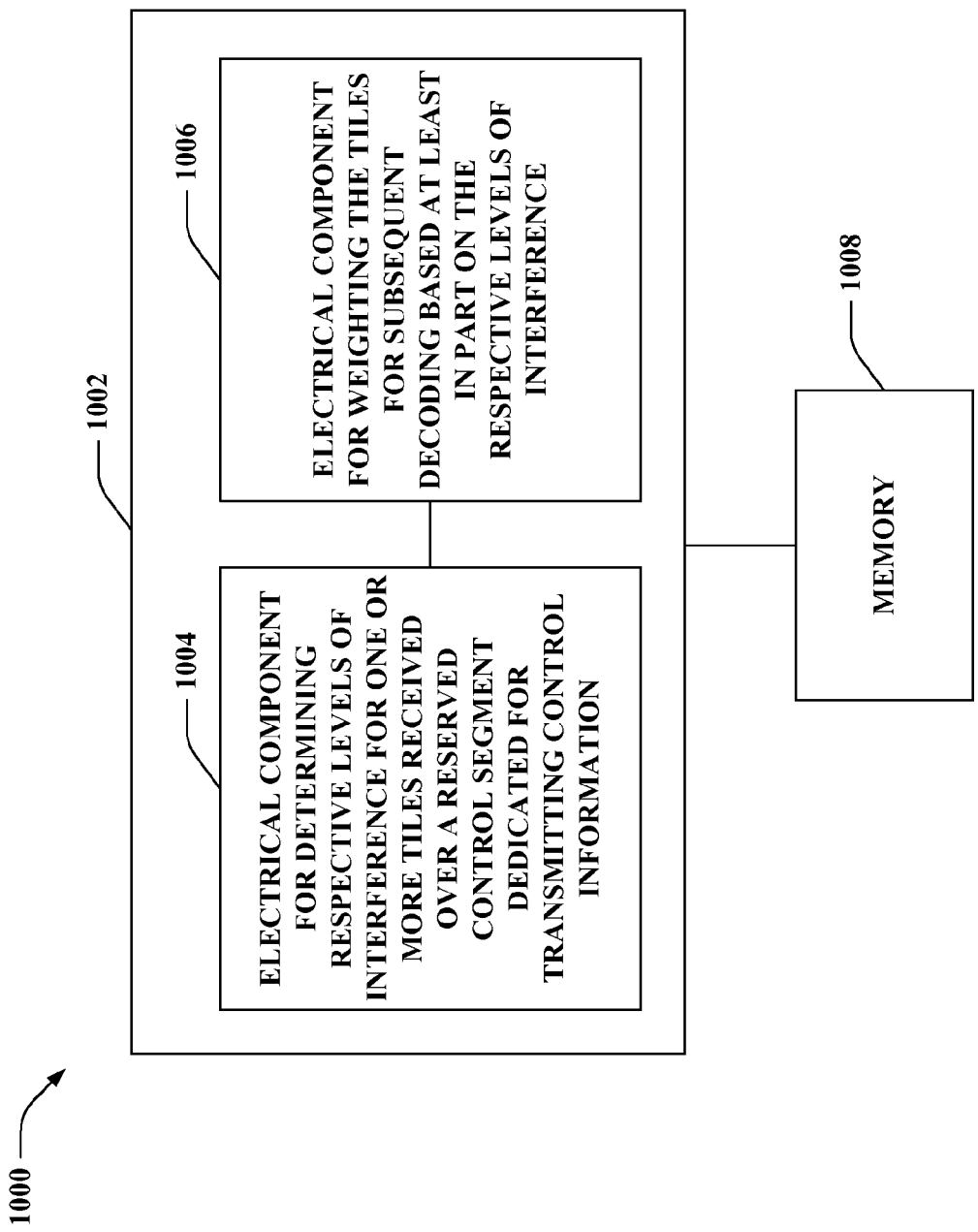
FIG. 10 is an illustration of an example system that receives control information in a wireless network.

With reference to FIG. 10, illustrated is a system 1000 that facilitates receiving control information in a wireless network. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for determining respective levels of interference for one or more tiles received over a reserved control segment dedicated for transmitting control information 1004. For example, substantially all similar transmitting systems can blank or reduce power for non-control information communications over the reserved control segment to mitigate interference for transmitting control information. Moreover, though mobile devices can transmit the control information during the reserved control information portion of bandwidth, interference can still occur within the control information transmissions. However, the more portions of bandwidth used for multiplexing, the lower the chance of interference. Even so, the interference can be partial, which can result in the control channels still being estimated and data decoded from the portion of bandwidth. Moreover, logical grouping 1002 can comprise an electrical component for weighting the tiles for subsequent decoding based at least in part on the respective levels of interference 1006. Thus, as mentioned, the control information can be partially interfered in one example; in this case, the weighting can facilitate determining which portions to utilize in decoding the control information. Additionally, system 1000 can include a memory 1008 that retains instructions for executing functions associated with electrical components 1004 and 1006. While shown as being external to memory 1008, it is to be understood that one or more of electrical components 1004 and 1006 can exist within memory 1008.

Figure 11:
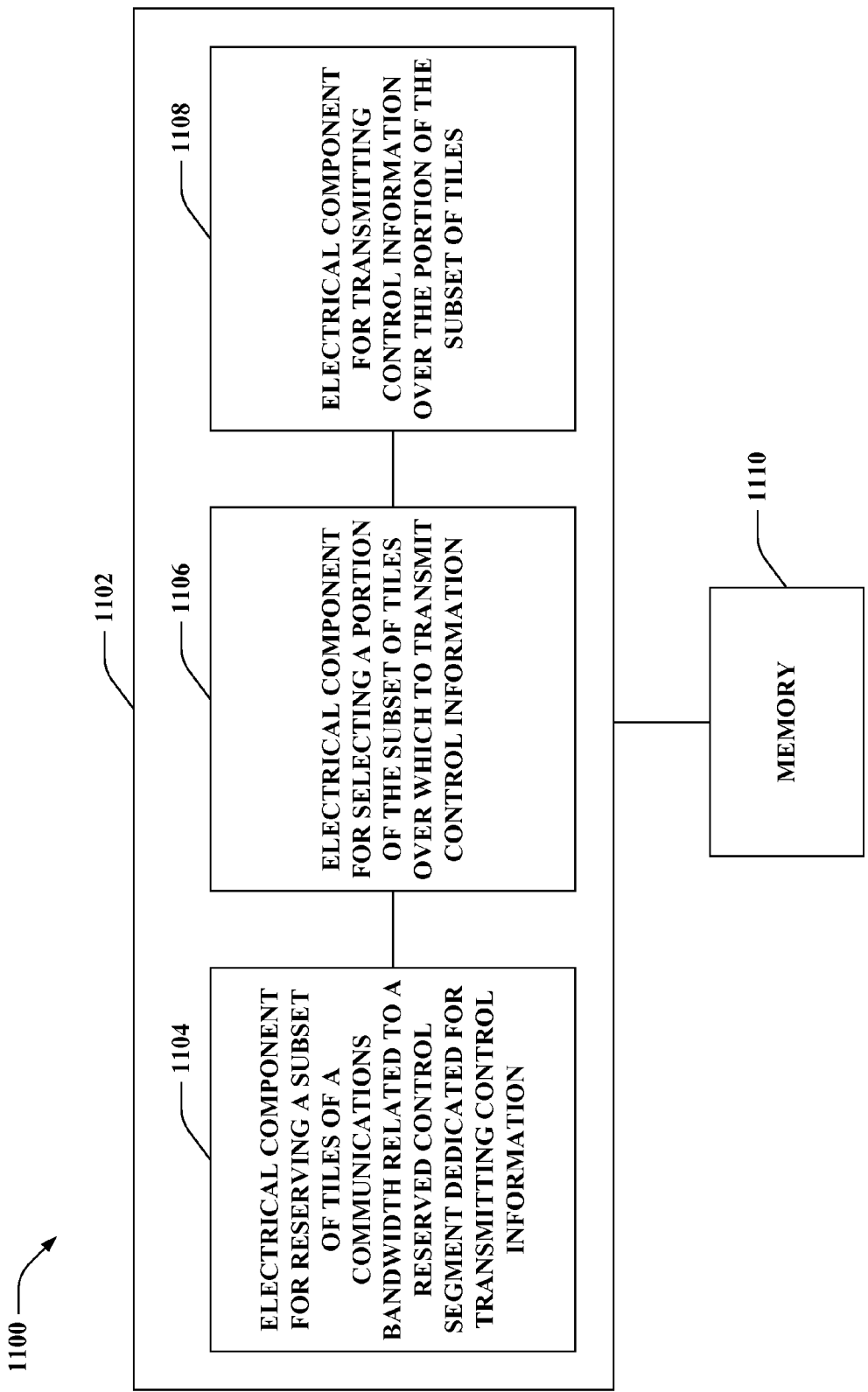
FIG. 11 is an illustration of an example system that transmits control information in a wireless network.

Turning to FIG. 11, illustrated is a system 1100 that communicates control information over reserved portions of bandwidth in wireless networks. System 1100 can reside within a base station, mobile device, etc., for instance. As depicted, system 1100 includes functional blocks that can represent functions implemented by a processor, software, or combination thereof (e.g. firmware). System 1100 includes a logical grouping 1102 of electrical components that facilitate communicating the control information. Logical grouping 1102 can include an electrical component for reserving a subset of tiles of a communications bandwidth related to a reserved control segment dedicated for transmitting control information 1104. The control information can relate to signal strength and/or SNR on resources provided by the access point, such as a data channel and/or the like, and the disparate wireless communications apparatuses can blank regular non-control information transmissions over the reserved control segment to facilitate lowering possible interference over the reserved control segment. Further, logical grouping 1102 can comprise an electrical component for selecting a portion of the subset of tiles over which to transmit control information 1106. The portion can be chosen as described herein, such as randomly, pseudo-randomly, based on a transmitter identifier, and/or the like. Moreover, logical grouping 1102 can comprise an electrical component for transmitting control information over the portion of the subset of tiles 1108. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communicating control information in wireless networks, comprising:
    receiving, at a communications apparatus, control information from a transmitting apparatus, the control information being received over one or more tiles that are a portion of a reserved control segment that is dedicated for transmitting the control information, wherein a tile comprises a set of tones that includes at least one pilot signal and the control information is multiplexed over a plurality of tiles to thereby increase the probability that at least a portion of the tiles are not interfered;
    determining, at the communications apparatus, respective levels of interference affecting respective transmissions on the one or more tiles, wherein the respective level of interference affecting transmission on a tile is determined based at least in part on interference affecting transmission of the at least one pilot signal included in the tile; and weighting, at the communications apparatus, the tiles for channel estimation for subsequent data decoding with a low probability of interference based at least in part on the respective levels of interference, wherein assignment of respective weights is dependent on the respectively associated levels of interference, such that the higher the level of interference, the lower the associated weight and vice versa, and such that a first tile is given less weight for the channel estimation than a second tile if the first tile has a higher level of interference than the second tile.

2. The method of claim 1, further comprising determining the one or more tiles based at least in part on a random or pseudo-random function utilized by a transmitter.

3. The method of claim 2, the random or pseudo-random function is specific to the transmitter.

4. The method of claim 1, further comprising estimating a frequency response from the one or more tiles.

5. The method of claim 4, further comprising decoding the control information from the one or more tiles based at least in part on the frequency response.

6. The method of claim 4, the frequency response is estimated based at least in part on a subset of the one or more tiles with a level of interference less than a threshold interference.

7. The method of claim 1, the one or more tiles comprise one or more contiguous tones of one or more contiguous OFDM symbols.

8. The method of claim 6, the control information is randomly multiplexed as one or more encoded modulation symbols over the one or more tiles.

9. The method of claim 1, wherein during the reserved control segment, multiple transmitting apparatuses blank or reduce power for non-control information.

10. The method of claim 1, wherein the respective level of interference for a tile is determined based only on the at least one pilot signal included in the tile.

11. A wireless communications apparatus, comprising:
at least one processor configured to determine a level of interference affecting transmission on one or more control information tiles received from a transmitting apparatus over a reserved control segment and weight the control information tiles for channel estimation for subsequent data decoding with a low probability of interference based at least in part on the level of interference, wherein the control information tiles are a portion of the reserved control segment and multiplexed over a plurality of tiles to thereby increase the probability that at least a portion of the tiles are not interfered, wherein assignment of a weight is dependent on the associated level of interference, such that the higher the level of interference, the lower the associated weight and vice versa, and such that a first control information tile is given less weight for the channel estimation than a second control information tile if the first control information tile has a higher level of interference than the second control information tile, wherein a control information tile comprises a set of tones that includes at least one pilot signal, and wherein the level of interference affecting transmission on a control information tile is determined based at least in part on interference affecting transmission of the at least one pilot signal included in the control information tile; and
a memory coupled to the at least one processor.

12. The wireless communications apparatus of claim 11, the one or more control information tiles comprise one or more tones over one or more OFDM symbols.

13. The wireless communications apparatus of claim 12, the control information tiles are partially interfered by one or more disparate control information tiles received from a disparate device over at least a portion of the control information tiles.

14. The wireless communications apparatus of claim 11, the one or more control information tiles are randomly positioned in the reserved control segment.

15. The wireless communications apparatus of claim 14, the random positioning is specific to a transmitter of the one or more control information tiles.

16. The wireless communications apparatus of claim 14, the one or more control information tiles are contiguous in time or frequency over the reserved control segment.

17. A wireless communications apparatus that facilitates communicating control information in wireless networks, comprising:
means for determining respective levels of interference affecting respective transmissions on one or more tiles received from a transmitting apparatus over a reserved control segment that is dedicated for transmitting control information, wherein the one or more tiles are a portion of the reserved control segment and multiplexed over a plurality of tiles to thereby increase the probability that at least a portion of the tiles are not interfered, wherein a tile comprises a set of tones that includes at least one pilot signal, and wherein the respective level of interference affecting transmission on a tile is determined based at least in part on interference affecting transmission of the at least one pilot signal included in the tile; and means for weighting the tiles for channel estimation for subsequent data decoding with a low probability of interference based at least in part on the respective levels of interference, wherein assignment of respective weights is dependent on the respectively associated levels of interference, such that the higher the level of interference, the lower the associated weight and vice versa, and such that a first tile is given less weight for the channel estimation than a second tile if the first tile has a higher level of interference than the second tile.

18. The wireless communications apparatus of claim 17, further comprising means for determining the one or more tiles based at least in part on a random or pseudo-random function utilized by a transmitter.

19. The wireless communications apparatus of claim 18, the random or pseudorandom function is specific to the transmitter.

20. The wireless communications apparatus of claim 18, further comprising means for transmitting a control information transmission scheme to the transmitter, control information is multiplexed over the one or more tiles according to the scheme.

21. The wireless communications apparatus of claim 17, further comprising means for estimating one or more control channels from the one or more tiles, control information is decoded based at least in part on the estimated control channels.

22. A computer program product, comprising:
a non-transitory computer-readable medium comprising:
code for causing at least one computer to receive control information from a transmitting apparatus, the control information being received over one or more tiles that are a portion of a reserved control segment that is dedicated for transmitting the control information and multiplexed over a plurality of tiles to thereby increase the probability that at least a portion of the tiles are not interfered, wherein a tile comprises a set of tones that includes at least one pilot signal; code for causing the at least one computer to determine respective levels of interference affecting respective transmissions on the one or more tiles, wherein the respective level of interference affecting transmission on a tile is determined based at least in part on interference affecting transmission of the at least one pilot signal included in the tile; and
code for causing the at least one computer to weight the tiles for channel estimation for subsequent data decoding with a low probability of interference based at least in part on the respective levels of interference, wherein assignment of respective weights is dependent on the respectively associated levels of interference, such that the higher the level of interference, the lower the associated weight and vice versa, and such that a first tile is given less weight for the channel estimation than a second tile if the first tile has a higher level of interference than the second tile.

23. A wireless communication apparatus, comprising:
a processor configured to:
   determine respective levels of interference affecting respective transmissions on one or more tiles received from a transmitting apparatus over a reserved control segment that is dedicated for transmitting control information, wherein the one or more tiles are a portion of the reserved control segment, wherein a tile comprises a set of tones that includes at least one pilot signal, and wherein the respective level of interference affecting transmission on a tile is determined based at least in part on interference affecting transmission of the at least one pilot signal included in the tile; and
weight the tiles for channel estimation for subsequent data decoding based at least in part on the respective levels of interference, wherein assignment of respective weights is dependent on the respectively associated levels of interference, such that the higher the level of interference, the lower the associated weight and vice versa, and such that a first tile is given less weight for the channel estimation than a second tile if the first tile has a higher level of interference than the second tile; and
a memory coupled to the processor.

* * * * *